(No Model.)
J. J. MOORE & J. A. BALL.
BELT GUIDE.
No. 295,932. Patented Apr. 1, 1884.
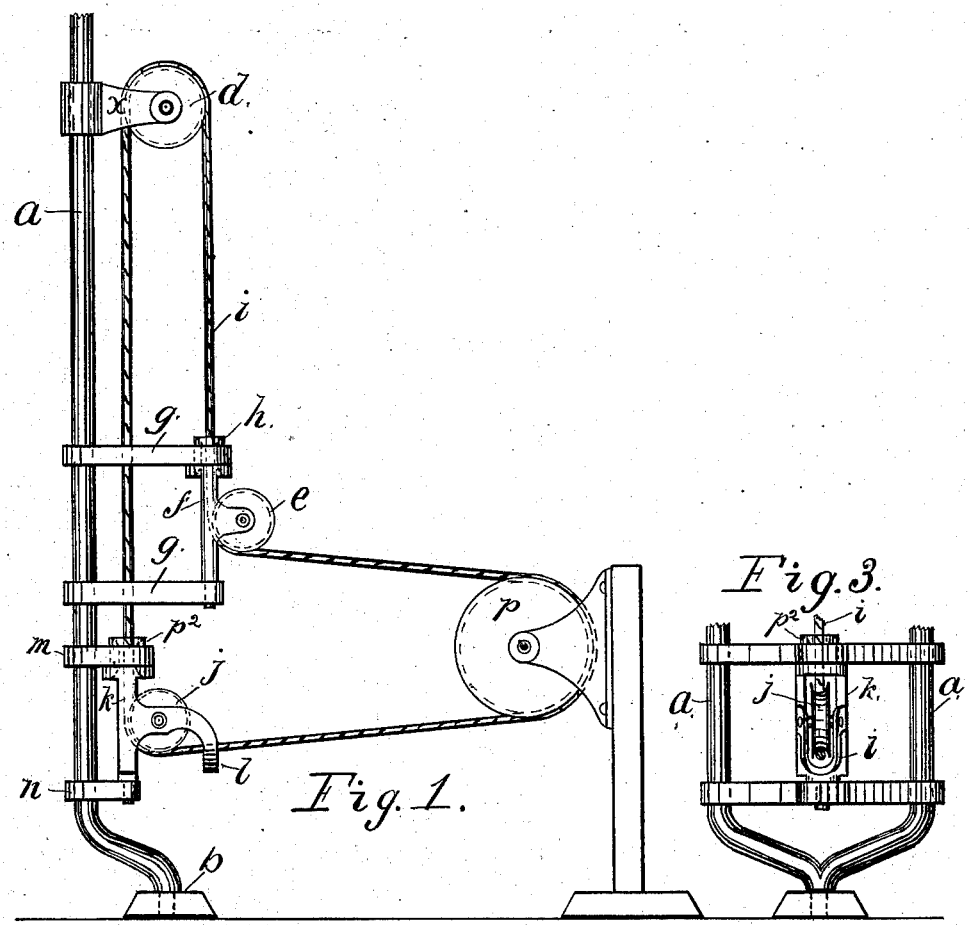

UNITED STATES PATENT OFFICE.

JONATHAN J. MOORE AND JAMES A. BALL, OF THORNTOWN, INDIANA.

BELT-GUIDE.

SPECIFICATION forming part of Letters Patent No. 295,932, dated April 1, 1884.

Application filed January 19, 1884. (No model.)

*To all whom it may concern:*

Be it known that we, JONATHAN J. MOORE and JAMES A. BALL, citizens of the United States, residing at Thorntown, in the county of Boone and State of Indiana, have invented an Improved Belt-Guide, of which the following is a specification.

Our invention relates to an improved guide for a round belt transmitting power from a pulley on a shaft in a fixed position to a shaft mounted on a turning support and having a variable position, as hereinafter described.

The object of our improvement is to so arrange a pair of idler-pulleys as to keep the belt constantly at the same tension and in line with a driving-pulley and a driven pulley, one of which is mounted on a shaft having a fixed support and the other on a shaft having a turning support, as hereinafter described.

The accompanying drawings illustrate our invention.

Figure 1 is a side elevation. Fig. 2 is a plan. Fig. 3 is a partial front elevation.

Our invention is well adapted for use in connection with that class of straw-stackers in which the straw-carrier is mounted on a turning support, and we have therefore illustrated it herein as attached to a stacker-frame.

In the drawings, $a$ represents the lower portion of a straw-stacker frame, pivoted at $b$, and adapted to turn about a vertical axis.

$c$ is a shaft having bearings in suitable brackets, $x$, secured to said frame.

$d$ is a pulley secured centrally on said shaft and in line with the vertical axis on which the frame turns.

$e$ is a sheave-pulley, mounted in a swinging frame, $f$. Said frame is pivoted vertically in brackets $g$ $g$, secured to the stacker-frame $a$. The upper pivot, $h$, is made hollow, to admit the passage of the belt $i$. Brackets $g$ $g$ are of such length that a line drawn through the center of the pivots on which frame $f$ turns will pass just clear of the periphery of pulley $d$ farthest from frame $a$. A second sheave-pulley, $j$, is mounted in a swinging frame, $k$, which is extended below the pulley to form a guard, $l$, which is for the purpose of preventing the belt from being thrown off the pulley by accidental blows. Said swing-frame $k$ has its upper pivot, $p^2$, hollow, like that of frame $f$, and for the same purpose, and it is pivoted in brackets $m$ $n$, secured to frame $a$. The length of said brackets is such that a line drawn through the center of the pivots on which frame $k$ swings will pass just clear of the periphery of pulley $d$ nearest to frame $a$.

$o$ is a fixed shaft, carrying a pulley, $p$, and driven by a belt from any suitable source of power passing over a driving-pulley, $q$, secured to said shaft. Shaft $c$ is driven by a round belt, $i$, passed over pulley $p$, under the guide-pulleys $e$ and $j$, and over pulley $d$.

In operation, as frame $a$ turns on its pivot and shaft $c$ forms an angle with shaft $o$, as shown in dotted lines, Fig. 2, frames $f$ and $k$ turning on their pivots, which are located at equal distances opposite of the axis of frame $a$, pulleys $e$ and $j$ keep the belt at a uniform tension and in line with pulleys $d$ and $p$.

We claim as our invention—

1. The combination, with a shaft in a fixed position, a pulley on said shaft, a shaft mounted on a turning support, a pulley on said shaft, and a round belt passing over said pulleys, of a pair of pivoted frames, each carrying a sheave-pulley, and secured to said turning support, and arranged substantially as and for the purpose specified.

2. In a belt-guide, frame $f$, carrying pulley $e$, and having a hollow pivot, $h$, all substantially as specified.

3. In a belt-guide, frame $k$, having hollow pivot $p^2$ and guard $l$, and carrying a sheave-pulley, $j$, all substantially as specified.

JONATHAN J. MOORE.
JAS. A. BALL.

Witnesses:
WILLIAM H. SIMS,
SOLOMON SHARP.